United States Patent
Fedak

(10) Patent No.: US 12,530,704 B2
(45) Date of Patent: Jan. 20, 2026

(54) ELECTRONIC CONSUMER-TRACKING COUPONS

(71) Applicant: NCR Voyix Corporation, Duluth, GA (US)

(72) Inventor: Jan Fedak, Colleyville, TX (US)

(73) Assignee: NCR Voyix Corporation, Atlanta, GA (US)

( * ) Notice: Subject to any disclaimer, the term of this patent is extended or adjusted under 35 U.S.C. 154(b) by 1239 days.

(21) Appl. No.: 15/281,046

(22) Filed: Sep. 29, 2016

(65) Prior Publication Data
US 2018/0089710 A1   Mar. 29, 2018

(51) Int. Cl.
| | |
|---|---|
| *G06Q 30/0207* | (2023.01) |
| *G06Q 20/04* | (2012.01) |
| *G06Q 20/20* | (2012.01) |
| *G06Q 20/38* | (2012.01) |
| *G06Q 30/0226* | (2023.01) |
| *G06Q 30/0238* | (2023.01) |
| *H04L 67/02* | (2022.01) |
| *H04L 67/50* | (2022.01) |

(52) U.S. Cl.
CPC ....... *G06Q 30/0224* (2013.01); *G06Q 20/047* (2020.05); *G06Q 20/20* (2013.01); *G06Q 20/209* (2013.01); *G06Q 20/38215* (2013.01); *G06Q 20/387* (2013.01); *G06Q 30/0226* (2013.01); *G06Q 30/0238* (2013.01); *H04L 67/02* (2013.01); *H04L 67/535* (2022.05)

(58) Field of Classification Search
None
See application file for complete search history.

(56) References Cited

U.S. PATENT DOCUMENTS

2002/0083013 A1* 6/2002 Rollins .................. G06Q 20/02
705/76
2008/0262920 A1* 10/2008 O'Neill .................. G06Q 30/02
705/26.1

(Continued)

FOREIGN PATENT DOCUMENTS

KR    20100049894 A  *  5/2010  ........... G06Q 20/047
WO    WO-2013062481 A1  *  5/2013  ........... G06Q 20/209

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, Qingdao, China, 2009, pp. 320-329, doi: 10.1109/MUE.2009.62. (Year: 2009).*

(Continued)

*Primary Examiner* — Waseem Ashraf
*Assistant Examiner* — Scott Snider
(74) *Attorney, Agent, or Firm* — Schwegman Lundberg & Woessner, P.A.

(57) ABSTRACT

Embodiments of a system and method for associating a user with a physical transaction, are generally described herein. A method may include accessing a webpage based on a machine-readable indication printed on a receipt received as a result of a transaction, the webpage including a coupon, associating the coupon and the transaction with a user identification included in a browser attribute of the webpage, receiving, on the webpage, a user selection of a destination for the coupon, and sending the coupon to the destination.

20 Claims, 6 Drawing Sheets

(56) References Cited

U.S. PATENT DOCUMENTS

| | | | | |
|---|---|---|---|---|
| 2009/0118002 A1* | 5/2009 | Lyons | ................ | G07F 17/3227 463/29 |
| 2009/0170614 A1* | 7/2009 | Herrmann | ............... | G07F 17/32 463/43 |
| 2011/0238479 A1* | 9/2011 | Bova | ...................... | G06Q 30/02 705/14.26 |
| 2011/0246284 A1* | 10/2011 | Chaikin | ............ | G06Q 30/0207 705/14.1 |
| 2014/0295945 A1* | 10/2014 | Nanni | ................ | G07F 17/3241 463/25 |
| 2015/0112790 A1* | 4/2015 | Wolinsky | ............... | G06Q 20/32 705/14.38 |
| 2015/0193806 A1* | 7/2015 | Tarailo | ............... | G06Q 30/0217 705/14.19 |
| 2016/0071373 A1* | 3/2016 | Anderson | ........... | G07F 17/3239 463/25 |
| 2017/0018148 A1* | 1/2017 | Behm | .................... | G06Q 20/20 |
| 2017/0092076 A1* | 3/2017 | Anderson | ........... | G07F 17/3246 |
| 2017/0365126 A1* | 12/2017 | Ghia | ................... | G06Q 20/202 |

OTHER PUBLICATIONS

K. T. Wadsworth, M. T. Guido, J. F. Griffin and A. Mandil, "An innovation in paper receipts: the electronic receipt management system," 2010 IEEE Systems and Information Engineering Design Symposium, Charlottesville, VA, USA, 2010, pp. 88-93, doi: 10.1109/SIEDS.2010.5469674 (Year: 2010).*

* cited by examiner

RECEIPT
DATE
STORE

ITEM 1     PRICE
ITEM 2     PRICE
ITEM 3     PRICE
ITEM 4     PRICE

TAX
TOTAL

CONGRATULATIONS! YOU RECEIVED A COUPON. SCAN THE CODE OR VISIT THE LINK BELOW TO ACCESS THE COUPON.

HTTP://WWW.WEBSITE.COM/A6G4KX8

ELECTRONIC CONSUMER-TRACKING COUPONS

BACKGROUND

Merchants, vendors, and other sellers often seek to understand behavior of the consumers. This may be done for a variety of reasons, such as to learn what consumers are looking for when they shop for products or services or to increase sales. Merchants typically employ a variety of tactics such as loyalty programs or tracking aspects of consumer credit cards. While merchants track many customer interactions, some interactions are not trackable using the tactics currently used today.

SUMMARY

In various embodiments, methods and systems for associating a user with a physical transaction, are presented.

According to an embodiment, a method may include accessing a webpage based on a machine-readable indication printed on a receipt received as a result of a transaction, the webpage including a coupon, associating the coupon and the transaction with a user identification included in a browser attribute of the webpage, receiving, on the webpage, a user selection of a destination for the coupon, or sending the coupon to the destination.

According to an embodiment, a method may include receiving an indication that the coupon was used on a subsequent transaction. The coupon may be associated with the subsequent transaction and the previous transaction. For example, the chain of transactions may be associated with the browser attribute.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A typical seller of goods or services attempts to track customers to understand their behavior, improve interactions, or increase sales. Some physical transactions currently cannot be tracked without a user registering, such as for a membership or loyalty program, cash transactions, anonymous or pseudonymous credit card or debit card transactions, or the like. The systems and methods described herein allow for those transactions to be de-anonymized to track users without registration.

The systems and methods described herein track anonymous consumers who may have not yet registered with a merchant or service provider. The anonymous consumers may use coupons that appear anonymous to the consumers. The anonymous consumers may be tracked along with past transactions if or when the consumer registers.

Tracking user behavior may be done, for example, using cookies, embedded iframes, embedded images, or browser fingerprinting on the web. For example, an iframe or an image may be used to deliver and obtain a unique browser fingerprint. When used by the systems and methods herein, the webpage tracking may tie behaviors on the web with transactions in the physical world.

In an example, the systems and methods may be used with other techniques to identify consumers. The systems and methods described herein may be used to track an identity of an anonymous consumer across transactions with one or more merchants, by leveraging electronic coupons. Once a user is registered, the systems and methods herein may track future transactions as well as past transactions.

In an example, a system or method for associating a user with a physical transaction may include a physical transaction conducted at a point of sale (POS) device. A receipt for the physical transaction may include a unique machine-readable indication printed on the receipt. The machine-readable indication may direct the user to a webpage where the user may enter a short unique code to obtain a coupon. The machine-readable indication may include a link or uniform resource locator (URL) with a unique embedded code on a webpage where the consumer may obtain a coupon. The machine-readable indication may be a two-dimensional barcode (e.g., a quick response (QR) code), a barcode, etc. In an example, the machine-readable indication may be scanned by a consumer device and the webpage may be displayed on the consumer device for the coupon to be redeemed.

In an example, the first transaction may be associated with a tracked web session. The issued coupon may be associated with the tracked web session. A next transaction (e.g., one where the coupon is redeemed), may be associated with the issued coupon, and associated with the tracked web session.

Figure 1:
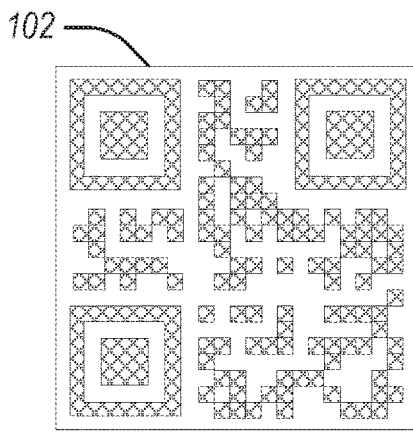
FIG. 1 illustrates generally a receipt including a machine-readable indication in accordance with some embodiments.

FIG. 1 illustrates generally a receipt 100 including a machine-readable indication 102 in accordance with some embodiments. The machine-readable indication 102 may include a two-dimensional barcode (e.g., a QR code), a barcode, a short URL, or the like. In an example, the receipt 100 includes a URL 104. The URL 104 or the machine-readable indication 102 may be used to access a webpage when entered in a browser or scanned. The URL 104 may contain a unique code pointing back to the originating transaction.

The machine-readable indication 102 may be used to obtain a coupon for a next purchase, the machine-readable indication 102 may be printed on a paper receipt (e.g., the receipt 100) for a completed transaction. In an example, the machine-readable indication 102 may be scanned or the URL may be visited to obtain the actual coupon. In an example, a consumer may scan the machine-readable indication 102 using a scanning device (e.g., scanning a QR code or visiting the URL) on a smart phone and receives a webpage with a coupon.

The receipt 100 may be dispensed in response to a purchase, such as a purchase of goods, a restaurant meal, a game ticket, services, etc. In an example, the coupon may be for the same thing purchased, or may be for a complementary service or good, or may be for an entirely independent good or service. Complementary services or goods may include, for example, team apparel when the receipt is for a game ticket, movie tickets when the receipt is for a restaurant purchase, computing accessories when the purchase is for a laptop, or the like.

Figure 2:
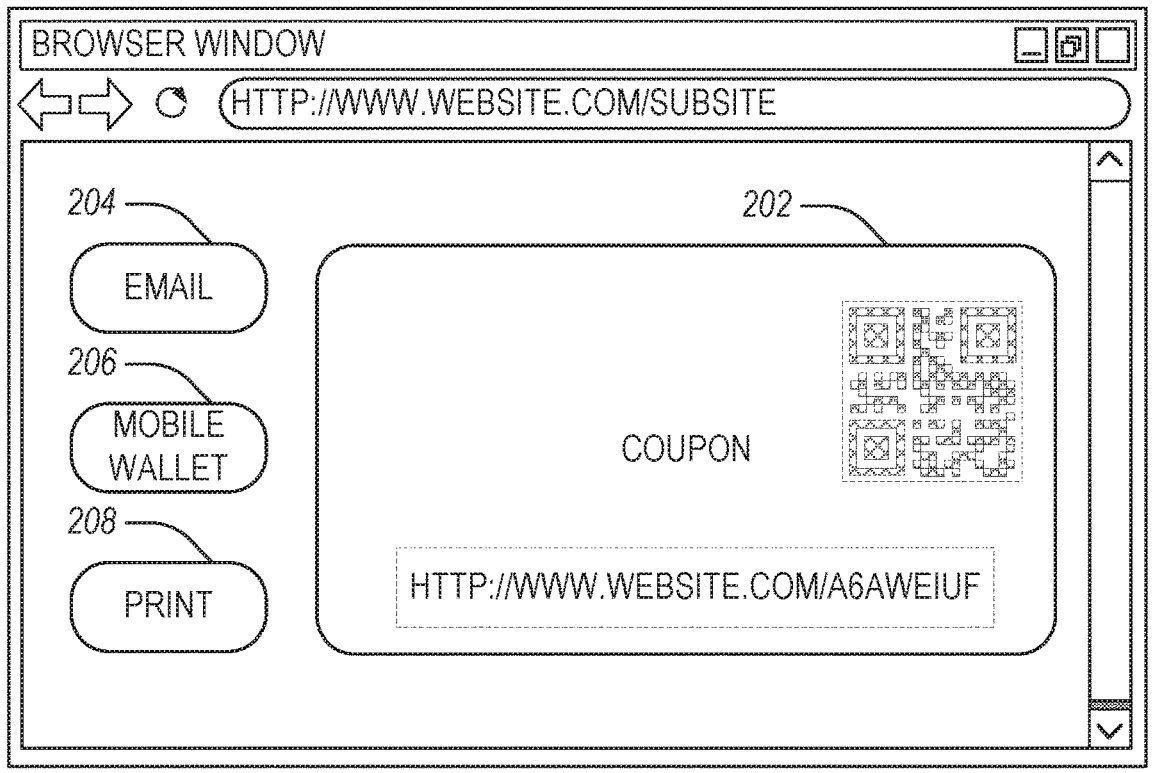
FIG. 2 illustrates generally a webpage including a coupon in accordance with some embodiments.

FIG. 2 illustrates generally a webpage 200 including a coupon 202 in accordance with some embodiments. The webpage 200 may include selectable indications including an email indication 204, a mobile wallet indication 206, a print indication 208, or the like. The selectable indications may be used to send the coupon 202 to a destination, such as an email address using the email indication 204, a mobile wallet using the mobile wallet indication 206, or a printer using the print indication 208. In an example, a destination may include an online coupon wallet. The online coupon wallet may be used to store coupons accessed via the webpage 200.

In an example, the coupon 202 may include a machine-readable indication or a webpage address (e.g., a URL, etc.), such as with a unique embedded code connecting the webpage visit to the originating transaction. In an example, the webpage 200 serving the coupon 202 may use web user tracking techniques (e.g., cookies, embedded image with cookies, embedded iframe, or browser fingerprinting) to determine a user identification. The user identification may be shared by one or multiple merchants, such as merchants participating in a marketing network.

When a user visits the webpage 200 for the first time, a new user identification may be established for the user and a new cookie may be issued to the user. In an example, the coupon 202 may include a unique ID and be associated with the user identification. In another example, when the user has visited the domain before, the user identification may be already known or stored. For example, the user identification may be stored in a cookie. The cookie may provide a server with the user identification when the webpage 200 is requested for displaying. The server may use the user identification from the cookie to supply the coupon 202 with the webpage 200 when serving the webpage 200 to a client device storing the cookie. The coupon 202 may include a unique ID and may be associated with the user identification. When the user access the coupon 202 using the webpage 200, the coupon 202 may be saved as accessed in a database. When the user uses the coupon 202 in a transaction (or sends it to an email address, mobile wallet, etc.), the transaction (or storage) may be saved in the database.

In an example, the QR code or URL of the coupon 202 may include a reference to the previous transaction. The previous transaction may be associated with the user identification.

The user may put the coupon into a mobile wallet using the mobile wallet indication 206 which may include registering an account using the mobile wallet. In another example, the user may send the coupon to an email address using the email address indication 204, which may include registering an account using the email address. The email address or the mobile wallet may be used for sending additional coupons, links to webpages, to track future transactions, etc.

The coupon 202 may or may not be identified on a receipt. The coupon 202 may be identified on the webpage 200 when a user visits the webpage 200 (and may change depending on the user identification, previously saved transactions, coupons, the transaction associated with the receipt, a time of day the webpage 200 is accessed, a day of week or date the webpage is accessed, whether the user is a registered user or unregistered user, etc.). The type of coupon 202 may be deferred until actual access by the user. In another example, the coupon 202 may be determined at a POS where the transaction was completed and the receipt was printed.

Figure 3:
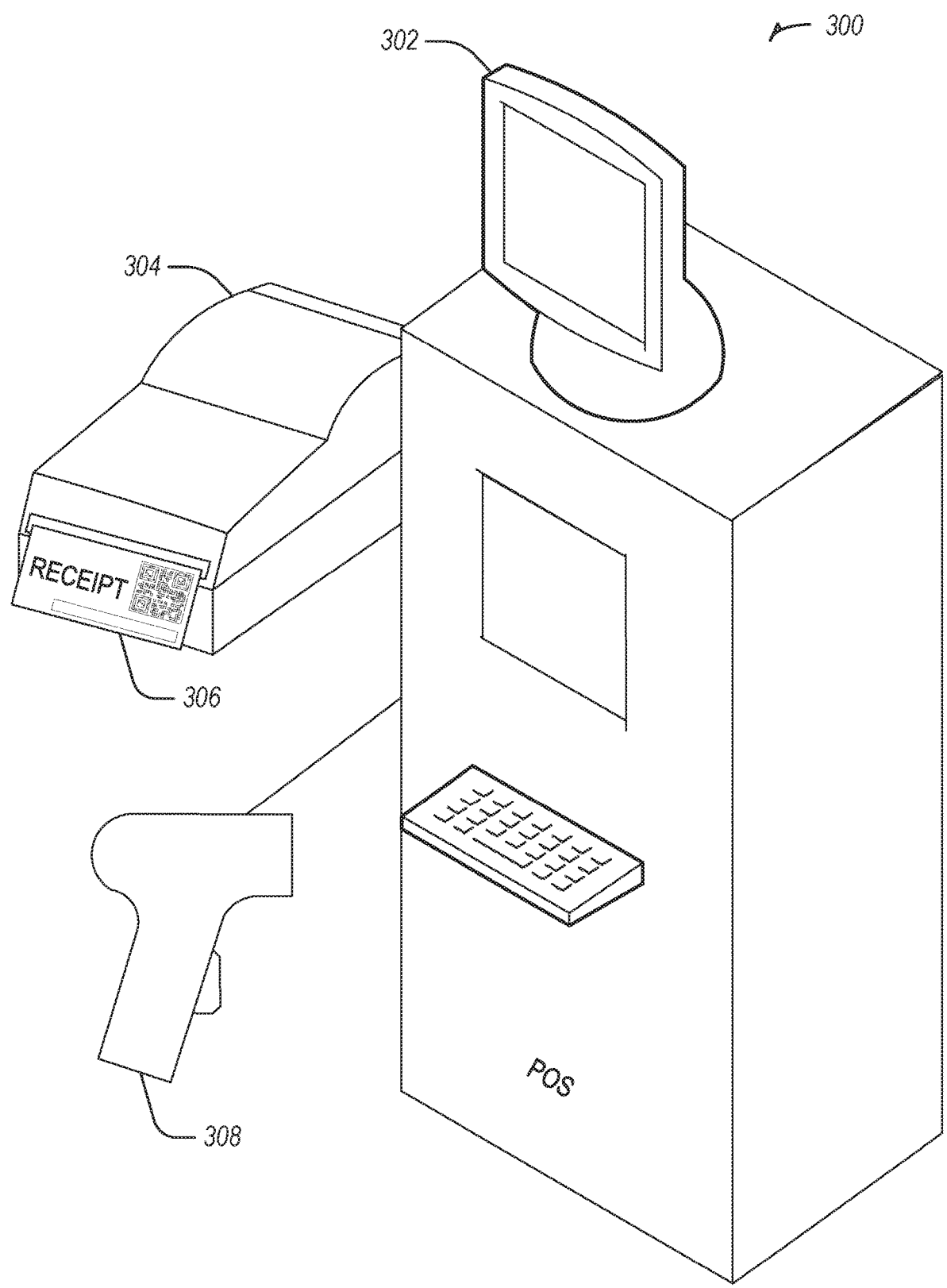
FIG. 3 illustrates generally a point of sale system in accordance with some embodiments.

FIG. 3 illustrates generally a POS system 300 in accordance with some embodiments. The POS system 300 includes a POS device 302 and a printer 304. The printer 304 may be used to print a receipt 306. In an example, the printer 304 may be incorporated into the POS device 302 or may be separate from the a POS device 302. A consumer may visit the POS system 300 and conduct a transaction. The transaction may be paid for and the receipt 306 may be printed for the transaction. The receipt 306 may include a machine-readable indication, such as a QR code. The machine-readable indication may be used to access a webpage including a coupon.

The POS system 300 may include a barcode scanner 308 (e.g., to scan a barcode, a QR code, etc.). The barcode scanner 308 may scan a coupon. The POS system 300 may record a unique coupon ID associated with the coupon or a new transaction being conducted with the coupon. The unique coupon ID may be sent to a remote system, which may record the use of the coupon, details about the transaction, or link the new transaction to the user or browser session that was used to produce the coupon.

In an example, when a consumer visits the POS system 300 in a subsequent visit, the consumer may use the coupon. The coupon may be scanned at the POS system 300 (e.g., using a scanner of the POS system 300). The POS system 300 may record a coupon identifier of the coupon. The coupon identifier may be sent to a server and stored with a user identification, the user identification associated with the previous transaction, the coupon, or a user device (e.g., using a cookie). By recording the coupon identifier on the POS system 300, the POS system 300 may later link the current purchase corresponding to the receipt 306 to the user identification.

A new coupon may be dispensed by the POS system 300 at the later transaction using the printer 304. The POS system 300 may use the later transaction to issue another paper receipt (including a coupon or machine-readable indication used to access a webpage with a coupon) to prolong the chain of transactions that may be linked together. In an example, when a coupon is not printed on the paper receipt for the later transaction the identity of the consumer may be linked to a scanned QR code or followed URL at a further later transaction, such as when the consumer uses the same device to scan the QR code or followed URL.

In an example, a coupon obtained in any other way (e.g., from email, from a webpage, from a QR code scanned on a poster, or the like) may be linked to the user identification when the coupon is claimed on a previously used device, using a previously registered account, or when a link is used that participates in the marketing network.

In an example, when the user registers, for example, for online ordering, to get better coupons, to join a loyalty program, to start receiving marketing communications, etc., the past transactions, coupons, or user identifications may be associated with the registration. For example, if the webpage the user uses to register uses the same tracking mechanism as the webpage (e.g., cookies, iframe, fingerprint, images, browser, etc.) or the same device, the registered user may be linked to the user's past transactions. In another example, if user registers on another machine (e.g., a PC, or by an associate at a merchant), the user identification may be linked to the registration when the user uses the new registration from a machine that has the appropriate tracking mechanism, such as cookies. When a user registers, the previously stored cookie may update historical transactions to be tied to the newly registered account. In an example, the registration may work with an app or account (e.g., a social media account, a bank app, or the like) instead of registering, in addition to registering, or as the registering (e.g., may be used with an email account or mobile wallet).

In an example, the POS device 302 may include a kiosk (e.g., a movie rental machine, a vending machine, etc.). In an example, the POS device 302 may include an automatic teller machine (ATM). In an example, the POS device 302 may include a self-service terminal (SST). In an example, the POS device 302 may include a chip and pin reader for a credit card, a debit card, an identification card, an integrated circuit card (chip card), or the like. For example, the chip and pin reader may be used to purchase goods or withdraw money. In an example, the POS device 302 may include a payment facilitating machine (e.g., a tablet with a card reader, etc.).

Figure 4:
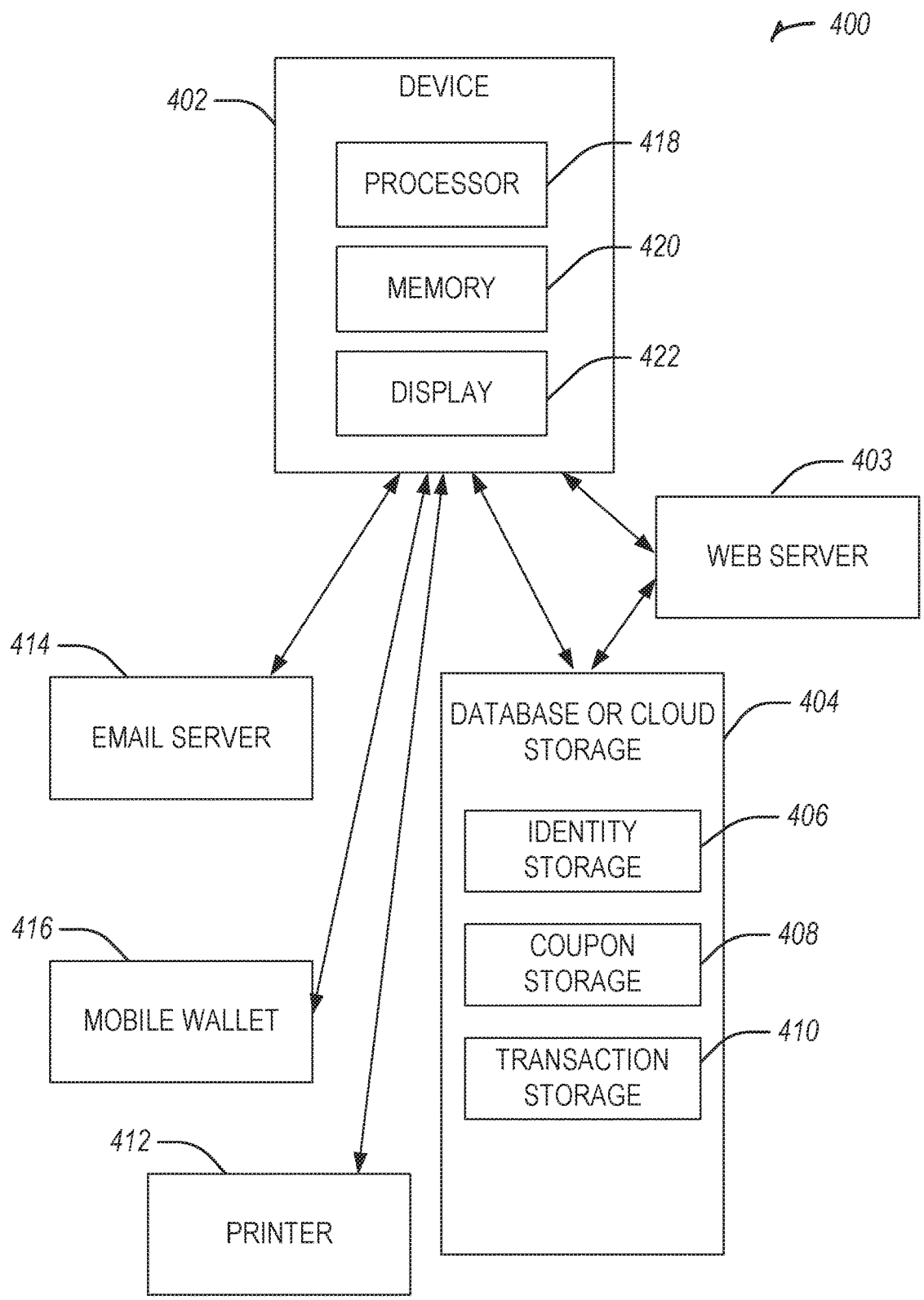
FIG. 4 illustrates generally a system for associating a user with a physical transaction in accordance with some embodiments.

FIG. 4 illustrates generally a system 400 for associating a user with a physical transaction in accordance with some embodiments. The system includes a device 402, one or more web or application servers (e.g., web server 403), and a database 404. The device 402 may be in communication with the servers 403, which in turn may communicate with the database 404 or an email server 414. The device 402 may communicate with a mobile wallet 416 or communicate with a printer 412. In an example the database 404 includes identity storage 406, coupon storage 408, or transaction storage 410.

The device 402 may include a processor 418, memory 420, and a display 422. In an example, the display 422 includes a user interface to display a webpage, such as a webpage based on a machine-readable indication printed on a receipt received as a result of a transaction. The webpage may include a coupon. The coupon may be stored in the coupon storage 408 of the database 404. The processor 418 may be used to associate the coupon and the transaction with a user identification. The transaction may be stored in the transaction storage 410 of the database 404. In an example, the transaction is an in-person transaction. In an example, the transaction is a physical transaction. In another example, the transaction is for a good or service. In another example, the transaction is conducted at a POS device.

The user identification may be stored in the identity storage 406 in the database 404. The user identification may be included in a browser attribute of the webpage displayed on the user interface of the display 422. In an example, the processor 418 may receive a user selection of a destination for the coupon, such as the email server 414, the mobile wallet 416, the printer 412, etc. The processor 418 may be used to send the coupon to the destination (e.g., the email server 414, the mobile wallet 416, or the printer 412). In an example, the database 404 may include a server or farm of servers, such as servers in the cloud, which may store the webpage or server logic, which may be served by the web server 403 to the device 402.

In an example, the machine-readable indication includes a QR code, a barcode, or a short uniform resource locator (URL). The device 402 may include a scanner or camera to scan the machine-readable indication. In an example, the device 402 is a mobile device (e.g., a tablet, a laptop, a phone, etc.).

In an example, the processor 418 may register a user corresponding to the user identification using an email address or a mobile wallet. The registered user information (e.g., the email address or the mobile wallet, a password, etc.), may be stored in the database 404, such as in the identity storage 406. The processor 418 may associate the user identification, the coupon, or the transaction with a registered user account.

In an example, the coupon includes a second machine-readable indication used to complete a second transaction. The second transaction may be associated with the user identification, and stored, such as in the transaction storage 410 of the database 404. The second transaction may be completed when a second machine-readable indication is scanned at a POS device.

In an example, the user identification may be retrieved from the identity storage 408 by the device 402. For example, when a user has previously accessed a webpage with the device 402, the user identification may have been stored in the identity storage 406 at that time. The previous access may have been associated with a previous transaction or a previous coupon, which may be stored in the transaction storage 410 or the coupon storage 408, respectively.

In an example, the browser attribute may include a cookie, an iframes, images, or a browser fingerprint to identify the browser. In an example, the coupon is not identified on the receipt. For example, the coupon may be stored in the coupon storage 408, but not yet associated with the user identification. Once the device 402 access the webpage, the coupon may be displayed and associated with the user identification. In another example, the coupon may be associated with the machine-readable indication or the webpage.

The processor 418 may be used to detect a third transaction including a second coupon associated with a second user identification and at least one coupon associated with the user identification in the database 404. For example, the second coupon may be stored in the coupon storage 408 and associated with the second user identification stored in the identity storage 406. The third transaction may use both the at least one coupon (e.g., the coupon from the transaction, or a later coupon associated with the user identification) and the second coupon. The processor 418 may send an indication to the database 404 to merge the user identification and the second user identification in the identity storage 406. The transactions and coupons associated with the user identification and the second user identification may then be associated with the merged user identification (which may be the user identification or the second user identification or a new user identification stored in the identity storage 406).

Figure 5:
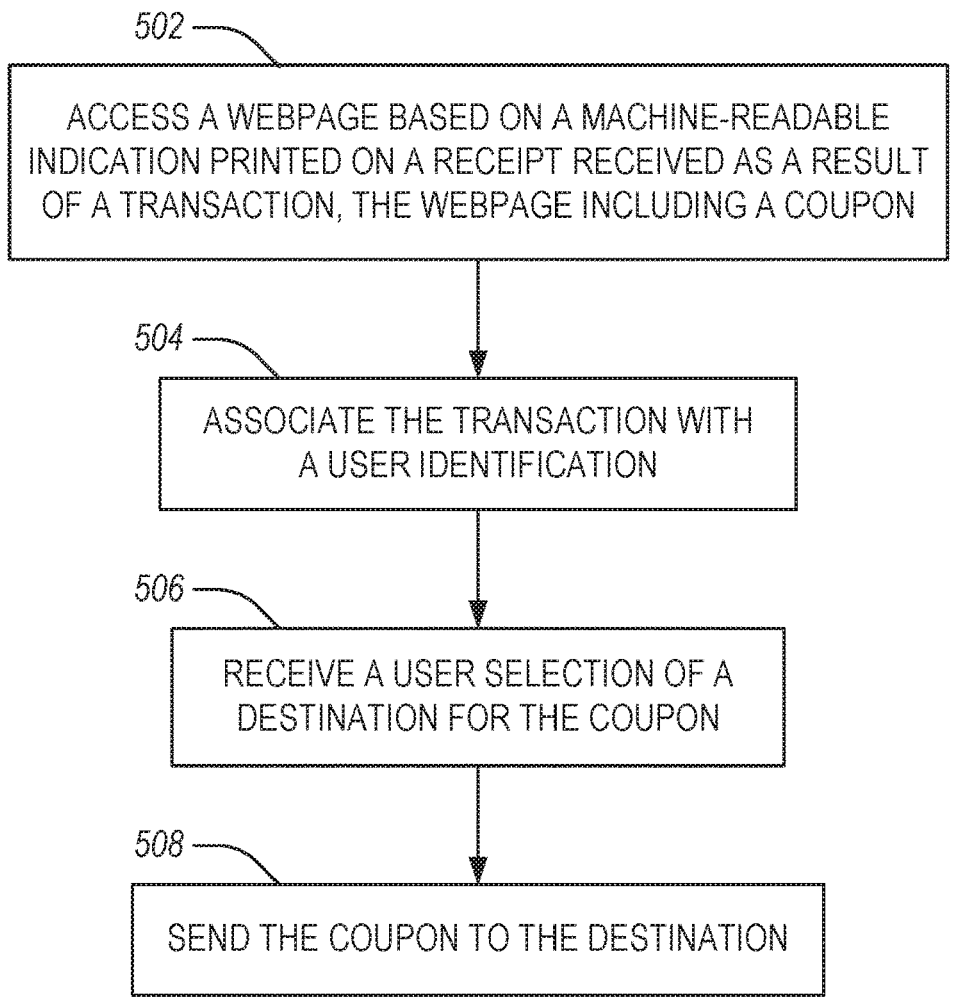
FIG. 5 illustrates generally a flowchart showing a technique for associating a user with a physical transaction in accordance with some embodiments.

FIG. 5 illustrates generally a flowchart showing a technique 500 for associating a user with a physical transaction in accordance with some embodiments. The technique 500 includes an operation 502 to access a webpage based on a machine-readable indication printed on a receipt received as a result of a transaction, the webpage including a coupon. In an example, the machine-readable indication includes a QR code, a barcode, or a short URL. Accessing the webpage may include accessing the webpage from a mobile device.

The technique 500 includes an operation 504 to associate the transaction with a user identification. Operation 504 may include associating the coupon with the user identification. In an example, the user identification is included in a browser attribute of the webpage. In an example, the browser attribute may include a cookie, an iframe, or a browser fingerprint.

In an example, the technique 500 may include selecting a coupon for a consumer. The coupon may be presented to the consumer. In an example, the coupon may include a static coupon. In another example, after the transaction is associated with the user identification, a coupon may be selected based on historical purchases by the user.

The technique 500 includes an operation 506 to receive a user selection of a destination for the coupon. The technique 500 includes an operation 508 to send the coupon to the destination. In an example, the destination may include an email server, a mobile wallet, a printer, or the like.

The technique 500 may include an operation to register a user account for a user, such as using a username, an email address, a mobile wallet, etc. The user identification, the coupon, or the transaction may be associated with the user account after registering. The technique 500 may include an operation to detect a third transaction including a second coupon associated with a second user identification and at least one coupon associated with the user identification. The operation may merge associated transactions and coupons of the user identification with associated transactions and coupons of the second user identification.

In an example, the technique 500 may include an operation to identify a user with multiple anonymous accounts. Initially, the multiple anonymous accounts may not be associated with the user. When the user, for example, uses two coupons from two different anonymous accounts, the operation may tie these two accounts together. For example, if the user accesses the coupons from a computer and a phone, the user may have two different accounts, and then the accounts may be tied together if the same coupon is accessed on both devices.

In an example, the technique 500 may include, an anonymous user at a grocery store, restaurant, etc., paying and receiving a receipt. The receipt may include a URL or QR code whereby the user may access a coupon on a webpage associated with the URL or QR code. When scanned (e.g., using a smart phone) or entered, the user may view the coupon. The technique 500 may check (e.g., based on stored cookies) whether the user has visited the webpage (or another webpage associated with the technique 500) before, and if so, may tie a new coupon to previously stored or saved coupons. The technique 500 may tie multiple transactions to the user account, such as for a single merchant (e.g., grocery store) or across multiple merchants. After visiting the page, the user may be emailed the coupon, such as after the user shares an email address. The user may be registered based on the shared email address. In an example, the user may save the coupon to a mobile wallet. In this example, the user may be registered using the mobile wallet. The user may scan the coupon at a POS. The POS may link the coupon used with other past purchases or coupons. The POS may output an additional coupon to be used in the same way, or tied to the user at a future use.

Figure 6:
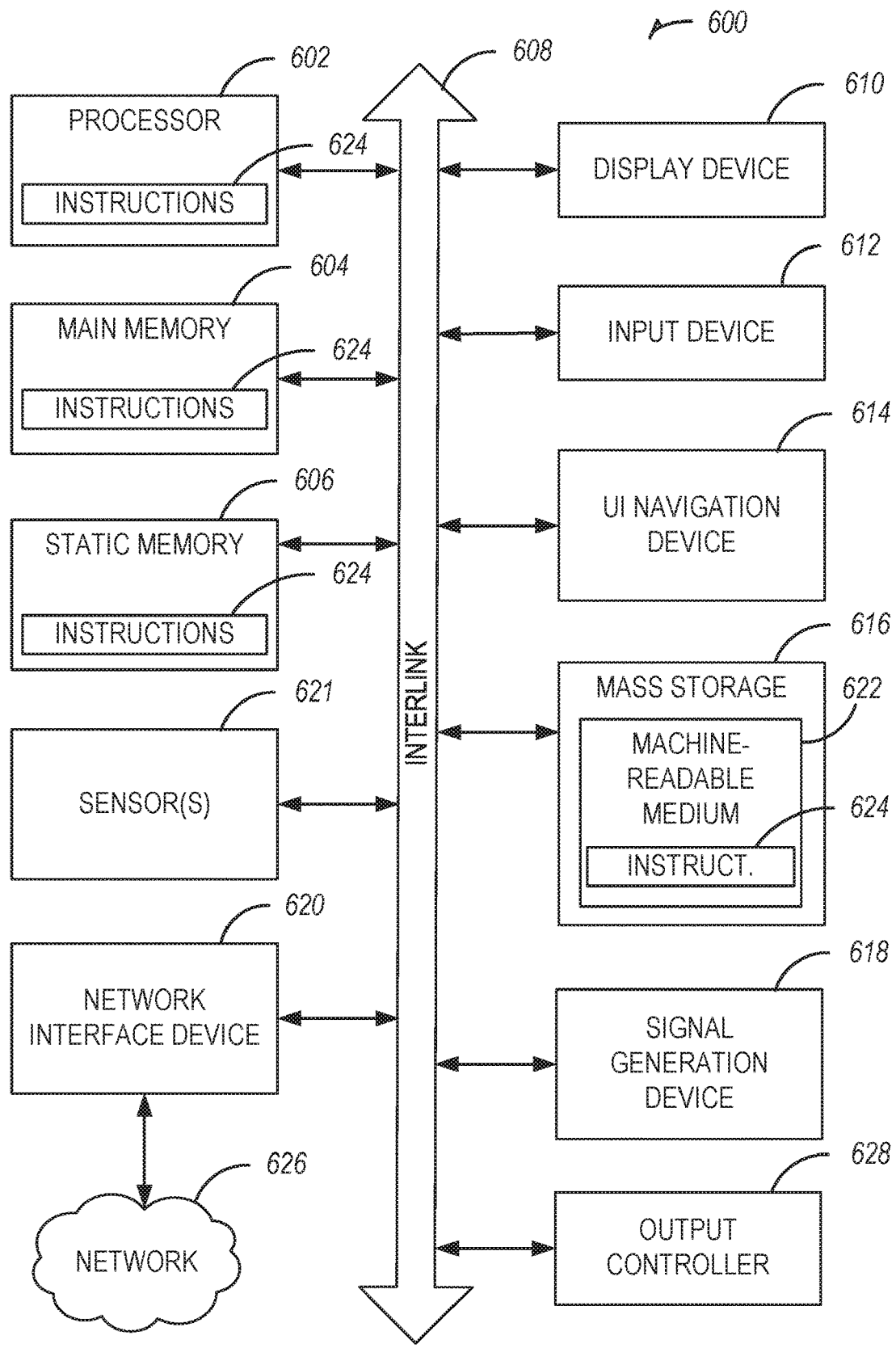
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a device comprising: a display, including a user interface to display a webpage based on a machine-readable indication printed on a receipt received as a result of a transaction, the webpage including a coupon; and a processor coupled to a memory device, the memory device containing instructions that, when executed by the processor, cause the processor to perform operations to: associate the coupon and the transaction with a user identification included in a browser attribute of the webpage displayed on the user interface; receive a user selection of a destination for the coupon; and send the coupon to the destination.

In Example 2, the subject matter of Example 1 optionally includes wherein the machine-readable indication includes a QR code, a barcode, or a short URL.

In Example 3, the subject matter of any one or more of Examples 1-2 optionally include wherein the device is a mobile device.

In Example 4, the subject matter of any one or more of Examples 1-3 optionally include wherein the destination is an email address, a mobile wallet, or a printer.

In Example 5, the subject matter of Example 4 optionally includes wherein the processor is further to register a user corresponding to the user identification using the email address or the mobile wallet.

In Example 6, the subject matter of any one or more of Examples 1-5 optionally include wherein the coupon includes a second machine-readable indication used to complete a second transaction.

In Example 7, the subject matter of Example 6 optionally includes wherein, when used to complete the second transaction, the second machine-readable indication is scanned at a point of sale (POS) device.

In Example 8, the subject matter of any one or more of Examples 6-7 optionally include wherein the processor is further to, in response to the second transaction being completed, associate the second transaction with the user identification.

In Example 9, the subject matter of any one or more of Examples 1-8 optionally include wherein the user identification was previously stored in a database and associated with a previous transaction.

In Example 10, the subject matter of any one or more of Examples 1-9 optionally include wherein the browser attribute includes at least one of a cookie, an iframe, or a browser fingerprint.

In Example 11, the subject matter of any one or more of Examples 1-10 optionally include wherein the processor is further to: register a user account for a user; and associate the user identification, the coupon, and the transaction with the user account.

In Example 12, the subject matter of any one or more of Examples 1-11 optionally include wherein the processor is further to: detecting a third transaction including a second coupon associated with a second user identification and at least one coupon associated with the user identification; and merging associated transactions and coupons of the user identification with associated transactions and coupons of the second user identification.

In Example 13, the subject matter of any one or more of Examples 1-12 optionally include wherein the coupon is not identified on the receipt.

Example 14 is a method comprising: accessing a webpage based on a machine-readable indication printed on a receipt received as a result of a transaction, the webpage including a coupon; associating the coupon and the transaction with a user identification included in a browser attribute of the webpage; receiving, on the webpage, a user selection of a destination for the coupon; and sending the coupon to the destination.

In Example 15, the subject matter of Example 14 optionally includes wherein the machine-readable indication includes a QR code, a barcode, or a short URL.

In Example 16, the subject matter of any one or more of Examples 14-15 optionally include wherein accessing the webpage includes accessing the webpage from a mobile device.

In Example 17, the subject matter of any one or more of Examples 14-16 optionally include wherein the browser attribute includes at least one of a cookie, an iframe, or a browser fingerprint.

Example 18 is at least one machine-readable medium including instructions for associating a user with a transaction, which when executed by a machine, cause the machine to: accessing a webpage based on a machine-readable indication printed on a receipt received as a result of the transaction, the webpage including a coupon; associating the coupon and the transaction with a user identification corresponding to the user, the user identification included in a browser attribute of the webpage; receiving, on the webpage, a user selection of a destination for the coupon; and sending the coupon to the destination.

In Example 19, the subject matter of Example 18 optionally includes instructions to register a user account for a user and associate the user identification, the coupon, and the transaction with the user account.

In Example 20, the subject matter of any one or more of Examples 18-19 optionally include instructions to: detect a third transaction including a second coupon associated with a second user identification and at least one coupon associated with the user identification; and merge associated transactions and coupons of the user identification with associated transactions and coupons of the second user identification.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device comprising:
a processor coupled to a memory device, the memory device containing instructions that, when executed by the processor, cause the processor to perform operations to:
identify a user identification stored at the device, the user identification corresponding to a first transaction at the device, and the user identification generated in response to occurrence of the first transaction at the device;
receive information from a scan of a machine-readable indication, the information including a unique identifier;
relate the user identification to the unique identifier based on the scan;
send a request, including the user identification corresponding to the first transaction, for a webpage to a web server, the request based on the information from the machine-readable indication including the unique identifier generated as a result of a prior transaction, the machine-readable indication printed on a receipt received as a result of a second transaction conducted after the first transaction, and the first, second, and prior transactions conducted without a user registration, wherein the second and prior transactions occurred at a point of sale device, and wherein the first transaction was conducted using the device;
receive the webpage from the web server, the webpage including a coupon associated with the user identification using a browser attribute of the webpage, the coupon generated using the unique identifier;
receive a user selection of a destination for the coupon;
send the coupon to the destination;
determine that the user registration has occurred on another device based on a subsequent registered access of the webpage at the device;
in response to the determination, associate the user identification with the user registration; and
link, based on the subsequent registered access of the webpage by the device, the first, second, and prior transactions to historical transactions associated with the user registration based on a previously stored cookie at the device corresponding to the first transaction.

2. The device of claim 1, wherein the machine-readable indication includes a QR code, a barcode, or a short uniform resource locator (URL).

3. The device of claim 1, wherein the device is a mobile device.

4. The device of claim 1, wherein the destination is an email address, a phone number, a printer, or a messaging application.

5. The device of claim 4, wherein the user registration is associated to the user identification using the email address or the phone number.

6. The device of claim 1, wherein the coupon includes a second machine-readable indication used to complete a third transaction.

7. The device of claim 6, wherein, when used to complete the third transaction, the second machine-readable indication is scanned at a point of sale (POS) device.

8. The device of claim 6, wherein the processor is further to, in response to the third transaction being completed, associate the third transaction with the user identification.

9. The device of claim 1, wherein the user identification was previously stored in a database and associated with a previous transaction.

10. The device of claim 1, wherein the browser attribute includes at least one of a cookie or a unique browser fingerprint.

11. The device of claim 1, wherein the processor is further to:
associate the coupon, and the second transaction with the user registration.

12. The device of claim 1, wherein the processor is further to:
detect a third transaction including a second coupon associated with a second user identification and at least one coupon associated with the user identification; and
merge associated transactions and coupons of the user identification with associated transactions and coupons of the second user identification.

13. The device of claim 1, wherein the coupon is not identified on the receipt.

14. A method comprising:
identifying a user identification stored at a user device, the user identification corresponding to a first transaction at the user device, and the user identification generated in response to occurrence of the first transaction at the user device;

receiving information from a scan of a machine-readable indication, the information including a unique identifier;

relating the user identification to the unique identifier based on the scan;

sending a request, including the user identification corresponding to the first transaction, for a webpage to a web server, the request based on the information from the machine-readable indication including the unique identifier generated as a result of a prior transaction, the machine-readable indication printed on a receipt received as a result of a second transaction conducted after the first transaction, and the first, second, and prior transactions conducted without a user registration, wherein the second and prior transactions occurred at a point of sale device, and wherein the first transaction was conducted using the user device;

receiving the webpage from the web server, the webpage including a coupon associated with the user identification using a browser attribute of the webpage, the coupon generated using the unique identifier;

receiving a user selection of a destination for the coupon;

sending the coupon to the destination;

determine that the user registration has occurred on another device based on a subsequent registered access of the webpage at the device;

in response to the determination, associate the user identification with the user registration; and link, based on the subsequent registered access of the webpage by the device, the first, second, and prior transactions to historical transactions associated with the user registration based on a previously stored cookie at the device corresponding to the first transaction.

15. The method of claim 14, wherein the machine-readable indication includes a QR code, a barcode, or a short uniform resource locator (URL).

16. The method of claim 14, wherein the user device is a mobile device.

17. The method of claim 14, wherein the browser attribute includes at least one of a cookie or a unique browser fingerprint.

18. At least one non-transitory machine-readable medium including instructions for associating a user with a transaction, which when executed by a machine, cause the machine to:

identify a user identification stored at a user device, the user identification corresponding to a first transaction at the user device, and the user identification generated in response to occurrence of the first transaction at the user device;

receive information from a scan of a machine-readable indication, the information including a unique identifier;

relate the user identification to the unique identifier based on the scan;

send a request, including the user identification corresponding to the first transaction, for a webpage to a web server, the request based on the information from the machine-readable indication including the unique identifier generated as a result of a prior transaction, the machine-readable indication printed on a receipt received as a result of a second transaction conducted after the first transaction, and the first, second, and prior transactions conducted without a user registration, wherein the second and prior transactions occurred at a point of sale device, and wherein the first transaction was conducted using the user device;

receive the webpage from the web server, the webpage including a coupon associated with the user identification using a browser attribute of the webpage, the coupon generated using the unique identifier;

receive a user selection of a destination for the coupon;

end the coupon to the destination;

determine that the user registration has occurred on another device based on a subsequent registered access of the webpage at the device;

in response to the determination, associate the user identification with the user registration; and link, based on the subsequent registered access of the webpage by the device, the first, second, and prior transactions to historical transactions associated with the user registration based on a previously stored cookie at the device corresponding to the first transaction.

19. The at least one machine-readable medium of claim 18, further comprising instructions to associate the coupon, and the second transaction with the user registration.

20. The at least one machine-readable medium of claim 18, further comprising instructions to:

detect a third transaction including a second coupon associated with a second user identification and at least one coupon associated with the user identification; and merge associated transactions and coupons of the user identification with associated transactions and coupons of the second user identification.

\* \* \* \* \*